US007437754B2

(12) United States Patent
Desai et al.

(10) Patent No.: US 7,437,754 B2
(45) Date of Patent: *Oct. 14, 2008

(54) WEB OBJECT ACCESS AUTHORIZATION PROTOCOL BASED ON AN HTTP VALIDATION MODEL

(75) Inventors: Ajay M. Desai, Redwood City, CA (US); Ming Lei, Fremont, CA (US); Ric Goell, Foster City, CA (US); Lawrence Jacobs, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 461 days.

This patent is subject to a terminal disclaimer.

(21) Appl. No.: 10/836,917

(22) Filed: Apr. 30, 2004

(65) Prior Publication Data

US 2005/0246383 A1 Nov. 3, 2005

(51) Int. Cl.
  *H04L 9/32* (2006.01)
  *G06F 15/16* (2006.01)

(52) U.S. Cl. .......................................... 726/4; 709/229
(58) Field of Classification Search ................ 713/201, 713/169; 709/229
See application file for complete search history.

(56) References Cited

U.S. PATENT DOCUMENTS

| 5,941,947 | A | * | 8/1999 | Brown et al. ................. 709/225 |
| 5,991,810 | A | | 11/1999 | Shapiro et al. ............... 709/229 |
| 6,081,900 | A | | 6/2000 | Subramaniam et al. ...... 713/201 |
| 6,226,752 | B1 | * | 5/2001 | Gupta et al. ................... 726/9 |
| 6,678,791 | B1 | | 1/2004 | Jacobs et al. ................. 711/118 |
| 6,807,606 | B2 | * | 10/2004 | Copeland et al. ............. 711/120 |
| 6,950,936 | B2 | * | 9/2005 | Subramaniam et al. ...... 713/169 |
| 7,089,316 | B2 | * | 8/2006 | Andersen et al. ............ 709/229 |
| 2002/0026511 | A1 | * | 2/2002 | Garcia-Luna-Aceves et al. .......................... 709/226 |

FOREIGN PATENT DOCUMENTS

WO    WO01/03398 A2    1/2001
WO    WO01/33340 A2    5/2001

\* cited by examiner

*Primary Examiner*—Nasser Moazzami
*Assistant Examiner*—Brandon S Hoffman
(74) *Attorney, Agent, or Firm*—Park, Vaughan & Fleming LLP; Edward J. Grundler (57) ABSTRACT

One embodiment of the present invention provides a system that facilitates serving data from a cache server. The system operates upon receiving a request for the data at the cache server. The system first determines if the request requires access control, and also if the data is available in the cache. If the request requires access control and if the data is available in the cache, the system sends an authorization request to an origin server. Upon receiving a response from the origin server, the system determines if the response is an authorization. If so, the system sends the data to the requester.

21 Claims, 4 Drawing Sheets

WEB OBJECT ACCESS AUTHORIZATION PROTOCOL BASED ON AN HTTP VALIDATION MODEL

BACKGROUND

1. Field of the Invention

The present invention relates to the field of computer systems. More particularly, the present invention provides a method and an apparatus for implementing a web object access authorization protocol based on an HTTP validation model.

2. Related Art

Caching systems are often employed on the Internet to enable faster responses to data requests, especially where the data being requested is stored or created on an origin server. A caching system can generally improve performance by storing all or a portion of the data in another device (e.g., a cache server).

In today's computing environments, cache servers typically cache data retrieved from an origin server. In this way, subsequent requests for the data can be sent directly to the requester from the cache server without having to retrieve the data from the origin server. Retrieving the data from the cache server helps eliminate network traffic. Additionally, retrieving data from the cache server obviates the need to request the data from the origin server and for the origin server to either look up or otherwise generate the data. Thus, caching the data at one or more cache servers reduces the load on the origin server, thereby allowing better response to requests for other data.

For high-volume, dynamic environments such as the Internet, existing caching systems are not designed to maintain a steady level of performance. Instead, such environments are generally configured to maintain a consistent level of data quality, typically by attempting to always provide the newest or more recent version of requested data. Thus, when a master copy or version of data that is cached is altered or replaced, the version in the cache must be updated or replaced before the cache can once again be used to satisfy users' requests. Until the cache is updated, requests for the data must be satisfied from the origin server. When a large amount of cached data must be replaced, data requests cannot be served from the cache and, unless the web site maintains a sufficient number of alternative, slower, devices to respond to the requests, performance of the web site may decline precipitously.

Sensitive data typically requires authentication and authorization of the requester or user prior to releasing the data to the user. This authentication and authorization can be performed by the origin server if all requests for the sensitive data are forwarded to the origin server. This solution, however, prevents the use of the cache server for the sensitive data.

Another technique is to place a copy of an access control list on each cache server. In this case the cache server can use the access control list to authenticate and authorize a requestor prior to sending the cached data to the user. One drawback to this technique is that multiple copies of the access control list exist on different cache servers, and these multiple copies must somehow remain synchronized. Synchronizing such access control lists is not an easy task.

Additionally, in some systems there is no access control list available at the origin server. Instead, the logic for access control is embedded in the application that generates the data. Hence, in these systems, no access control list is available to distribute to the cache servers. Instead, the logic for access control must somehow be distributed to the cache servers.

What is needed, therefore, is a method and an apparatus for storing sensitive data on a cache server without the problems described above.

SUMMARY

One embodiment of the present invention provides a system that facilitates serving data from a cache server. The system operates upon receiving a request for the data at the cache server. The system first determines if the request requires access control, and also if the data is available in the cache. If the request requires access control and if the data is available in the cache, the system sends an authorization request to an origin server. Upon receiving a response from the origin server, the system determines if the response is an authorization. If so, the system sends the data to the requester.

In a variation of this embodiment, determining if the request requires access control involves determining if a uniform resource locator (URL) associated with the request is identified as requiring access control.

In a further variation, the authorization request includes the requester's access data.

In a further variation, the access data for the requester includes a user name and a password.

In a further variation, the response indicates that the request is either authorized or not authorized.

In a further variation, if the data is not available in the cache, the system sends a content request to the origin server, which includes authentication data for the requester. If the origin server determines that the requester is authorized to receive the data, the origin server sends the data to the cache server. If the data is cacheable, the system stores the data in the cache. The system then sends the data to the requester.

In a further variation, the system determines at the origin server if the requester is authorized to access the data.

In a further variation, determining at the origin server if the requester is authorized to receive the data involves first validating the requester's identity, and then verifying the requester's access privilege. If the requester is authorized to receive the data, the system returns a success code. Otherwise, the system returns a failure code.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Data Caching System

Figure 1:
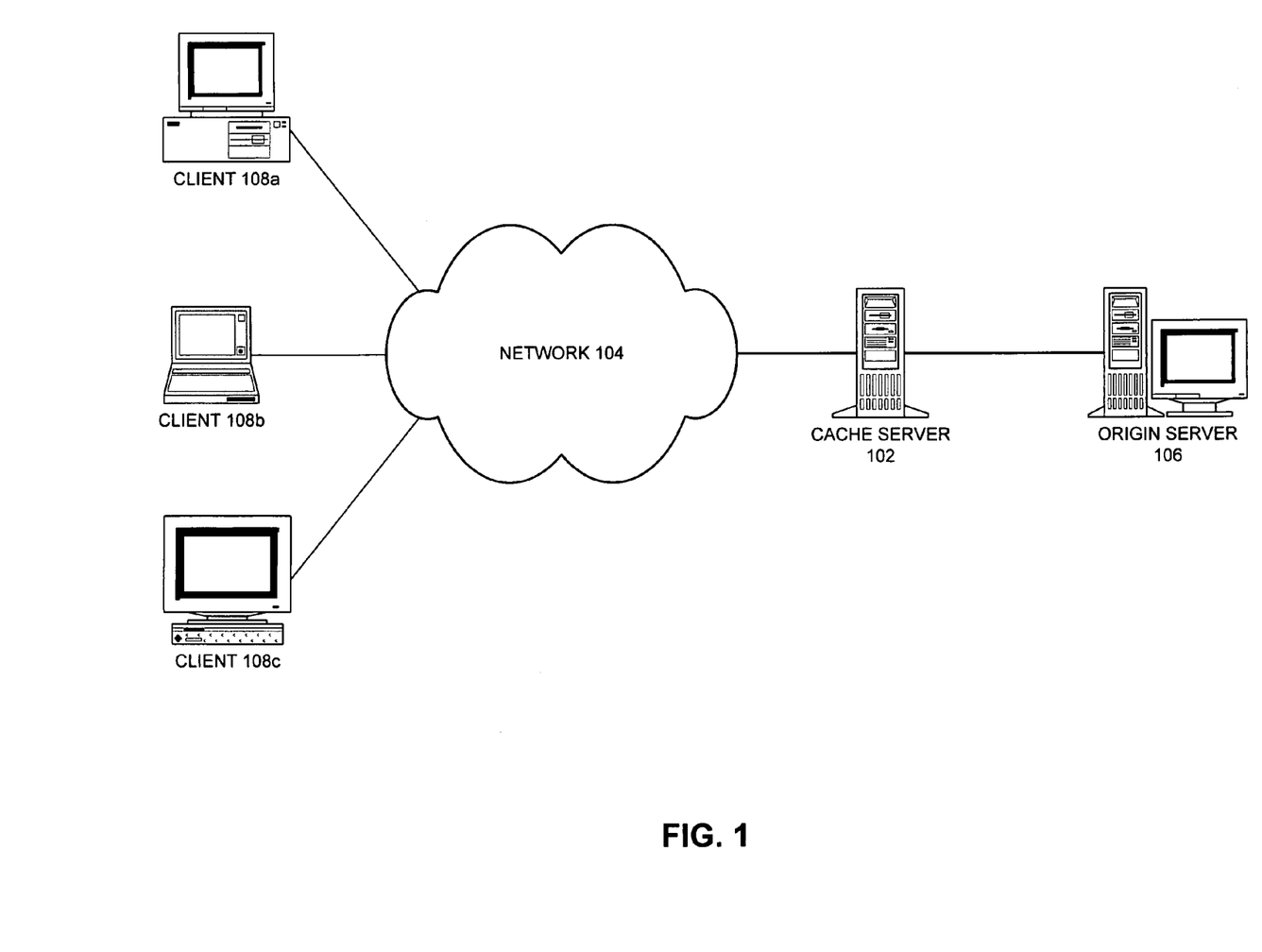
FIG. 1 is a block diagram depicting a system for caching data in accordance with an embodiment of the present invention.

FIG. 1 is a block diagram depicting a system for caching data in accordance with an embodiment of the present invention. In FIG. 1, cache server 102 is interposed between network 104 and one or more servers (e.g., web servers, content servers, data servers), such as origin server 106. Clients 108a, 108b, and 108c are coupled to network 104, through which they submit requests for content generated by and/or stored on origin server 106. Note that the term "client" generally refers to the hardware and the term "user" generally refers to the person using the client. These terms are used somewhat interchangeably in this description. In this embodiment, data served by origin server 106 may include textual, numerical, multi-media, or other types and forms of data suitable for transmission to a client through network 104 and may adhere to any of a variety of protocols or formats (e.g., HTTP, FTP, HTML, and XML).

Cache server 102 and origin server 106 can generally include any nodes on a computer network including a mechanism for servicing requests from a client for computational and/or data storage resources. Clients 108a-c can generally include any node on a network including computational capability and including a mechanism for communicating across the network.

Network 104 can generally include any type of wire or wireless communication channel capable of coupling together computing nodes. This includes, but is not limited to, a local area network, a wide area network, or a combination of networks. In one embodiment of the present invention, network 104 includes the Internet.

Although cache server 102 is separate and distinct from origin server 106 in the illustrated embodiment, in another embodiment of the invention one may be co-located with the other.

In one implementation of this embodiment, cache server 102 and origin server 106 provide access to an Internet web site. In this implementation, one or more of clients 108a, 108b, and 108c request access to information provided by origin server 106 and may employ a browser or any other suitable user interface to request the information.

Referring to FIG. 1, a subset of data generated or stored on origin server 106 is copied to cache server 102, from where it can be easily retrieved in response to user requests. Thus, during operation, cache server 102 can often respond to user requests with data stored in a local cache, without having to involve the origin server 106. However, the system may also resort to the content server for new or altered information. During normal operation (e.g., when requested data in cache server 102 is up to date with corresponding data on origin server 106), the request can be served by the cache server 102.

However, in cases where sensitive data is being retrieved from the cache, the cache server 102 must access origin server 106 to receive authorization before sending the data to the requester.

Any specific data item or other information on cache server 102 may be valid or invalid. A data item is valid if the data item on origin server 106 from which it was copied has not been changed, updated, or replaced. A data item is invalid if the original data on origin server 106 has been changed or replaced. For example, when data is changed or replaced on origin server 106, an invalidation signal can be sent to the cache server 102 to invalidate the corresponding data item(s). Thus, when cache server 102 receives and caches new data from theserver, it continues serving the data in response to user requests until it is informed that the data is invalid or should be removed or replaced.

When cache server 102 receives a request for which it contains no matching data, either valid or invalid, the request is forwarded on to origin server 106. When the requested data is subsequently returned from the origin server 106 may store it locally (and mark it valid) and forward it to the requesting user. When cache server 102 receives a request for data that is contained in the cache and when the request is for sensitive data, cache server 102 can request authorization from origin server 106 before serving the sensitive data to the user.

Cache Server

Figure 2:
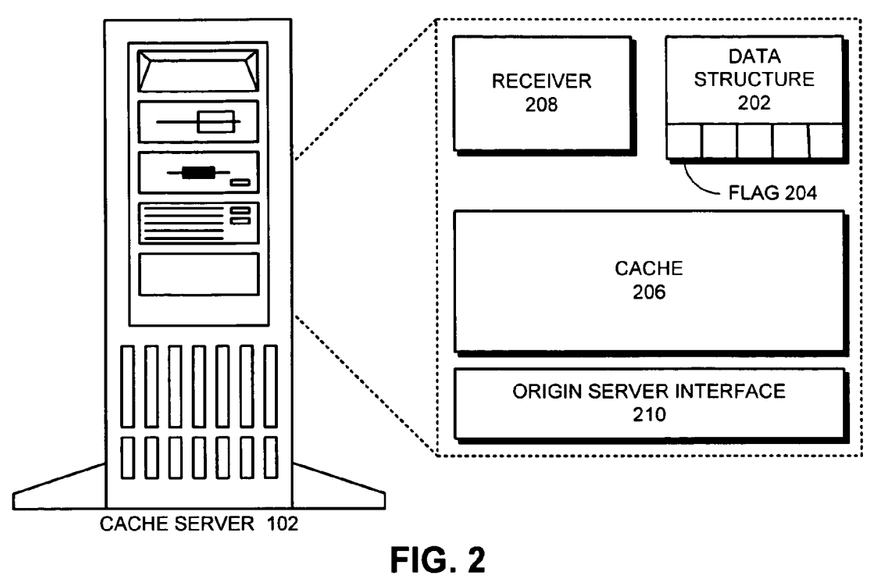
FIG. 2 illustrates a cache server in accordance with an embodiment of the present invention.

FIG. 2 illustrates a cache server 102 in accordance with an embodiment of the present invention. Cache server 102 includes receiver 208, data structure 202, cache 206, and origin server interface 210. Note that cache server 102 can include more than one web site. Data structure 202 includes, inter alia, flag 204. Flag 204 indicates whether data served from data structure 202 requires authentication. Flag 204 can be set based upon the uniform resource locator (URL) used to access data structure 202.

Receiver 208 communicates with clients 108a-c and receives requests from clients 108a-c for data. Receiver 208 additionally receives authentication data from clients 108a-c. This authentication data can include client name/password combinations. Note that other forms of authentication data can also be used. For example, the authentication data can include a digital certificate. Methods of supplying authentication data are well-known in the art and will not be discussed further herein.

Data structure 202 receives requests for data from clients 108a-c and, if the user is authorized, responds to these requests with the requested data. Data structure 202 uses flag 204 to determine if the user requires authorization prior to sending the requested data to the user.

Cache 206 saves data that is cacheable so that future requests for the same data can be sent to the user without receiving the data from origin server 106. If the data is located in cache 206 and flag 204 indicates that the user requires authorization prior to sending the data, origin server 106 is contacted to perform the authorization. Note that when the data is available in cache 206, origin server 106 only performs the authorization and does not prepare and send the data.

Origin server interface 210 communicates with origin server 106. When a user requests data and the data is not in the cache 206, origin server interface 210 requests the data from origin server 106. This request includes user authentication data when authentication is required. In one embodiment of the present invention, these requests are in hypertext transport protocol (HTTP) format. If the user is authorized to receive the data, the data is returned to cache server 102. Upon receiving the data, the system stores the data in cache 206 if the data is cacheable. Criteria for caching data in a web cache are well-known in the art and will not be discussed further herein. The data is then supplied to the requester.

If the data is located in cache 206, origin server interface 210 sends an HTTP request to origin server 106 for access authorization. For example, this request can be formatted as follows:

Get/neededauthorize/object1HTTP/1.

Host: securewebsite.com

Etag: auth-validate

Cookie: JESSEIONID=adfkfjdak

The response from origin server 106 to this request is a typical HTTP return code. For example, the return code "304" can indicate that the user is authorized to receive the data, while a return code of "514" can indicate that the user is not authorized to receive the data.

Origin Server

Figure 3:
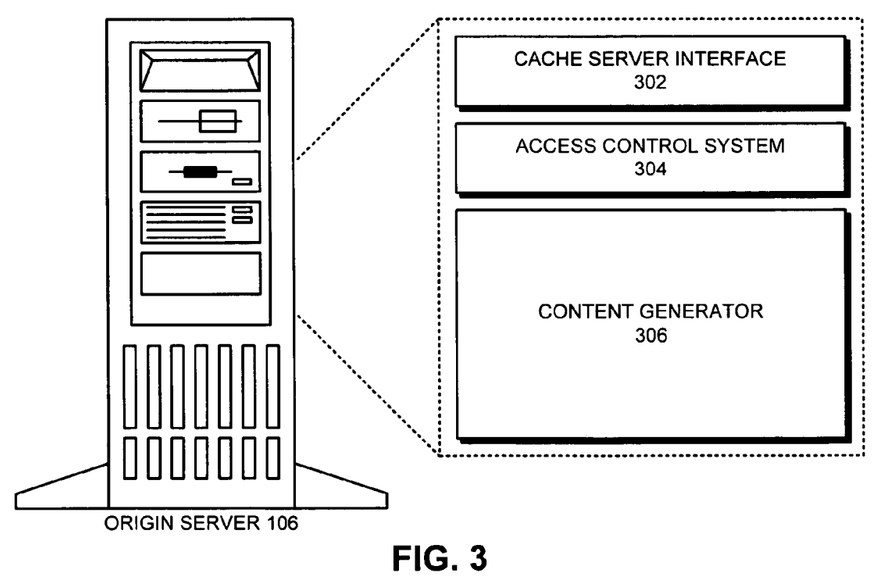
FIG. 3 illustrates an origin server in accordance with an embodiment of the present invention.

FIG. 3 illustrates an origin server 106 in accordance with an embodiment of the present invention. Origin server 106 includes cache server interface 302, access control system 304, and content generator 306. Cache server interface 302 communicates with cache server 102 and receives HTTP formatted requests for data. When the data is not stored in cache server 102, cache server interface 302 receives a request for the data. This request typically includes user authentication data, which can be used to authenticate the user and determine if the user is authorized to receive the data. If the user is authorized to receive the data, cache server interface 302 sends the data to cache server 102.

When the data is stored in cache server 102, cache server interface 302 receives a request for authentication. In this case, cache server interface 302 returns either a code indicating that the user is authorized to receive the data or a code indicating that the user is not authorized. For example, these codes can be normal HTTP response codes, such as "304" for authorized or "514" for not authorized.

Access control system 304 accepts the authorization data received from cache server 102 and authenticates the user and determines if the user is authorized to receive the data. Any type of authentication and authorization process can be used to authenticate the user and authorize the user to receive the data. For example, this can include user name/password authentication or other forms of authentication such as digital certificates. The authorization can be performed by using access control lists, or authorization functions that can be embedded code in an application. If the user is authenticated and is authorized to receive the data, access control system 304 returns an authorized or not authorized indication. Note that access control system 304 operates in the same manner regardless of whether or not the data is stored in cache 206.

Content generator 306 generates the requested data. This can include retrieving the data from a database, or the data can be generated by an application program each time that the data is required. Note that the data will be provided only if access control system 304 properly authenticates and authorizes the user.

Serving Data from the Cache Server

Figure 4:
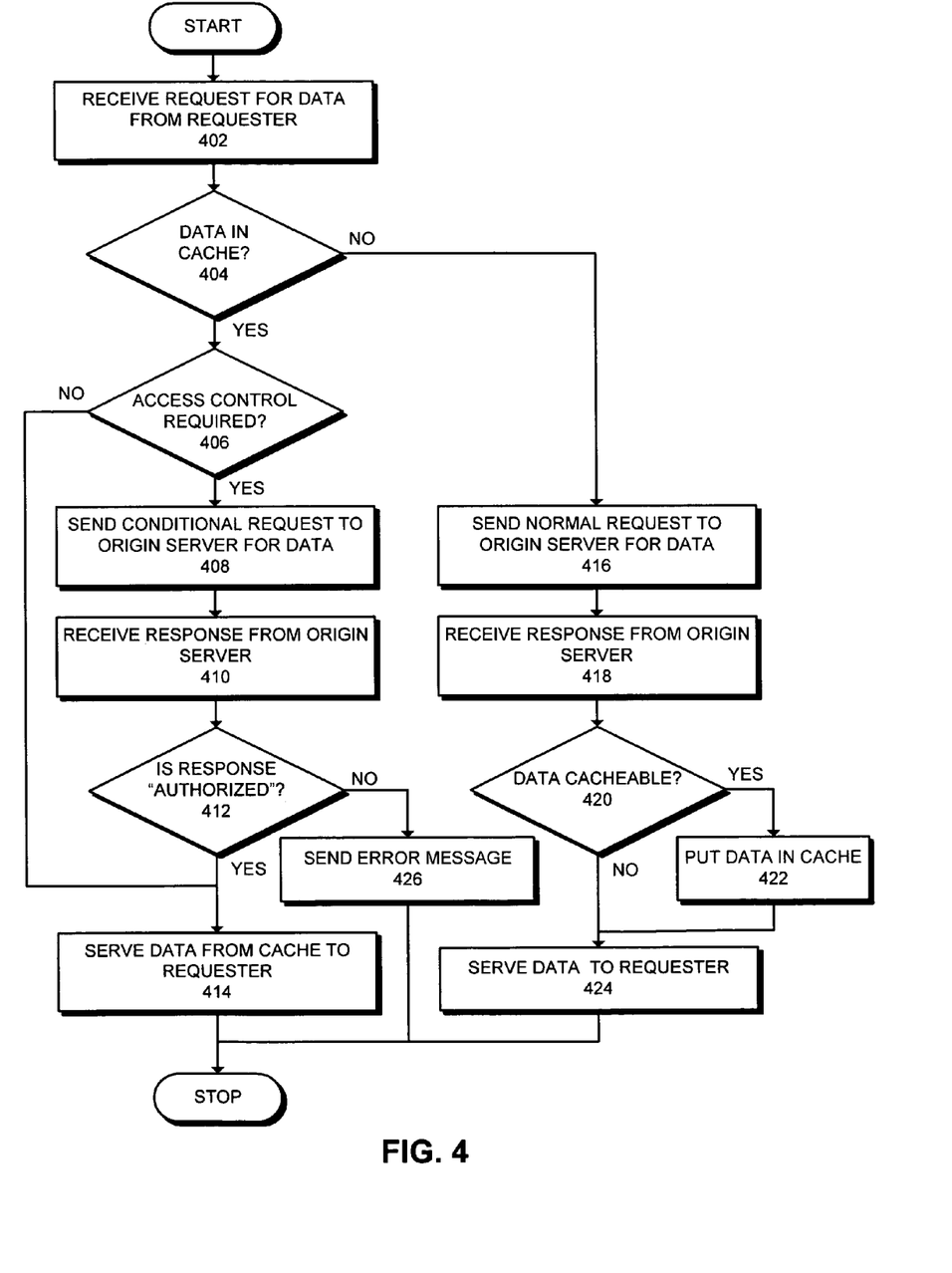
FIG. 4 presents a flowchart illustrating the process of serving data from a cache server in accordance with an embodiment of the present invention.

FIG. 4 presents a flowchart illustrating the process of serving data from a cache server in accordance with an embodiment of the present invention. The system starts when a request for data is received from a requester (step 402). In response to the request, the system determines if the data is in the cache (step 404).

If the data is in the cache, the system next determines if access control is required (step 406). If not, the system retrieves the data from the cache and sends it to the requester (step 414).

If access control is required at step 406, the system sends a conditional request to the origin server for the data (step 408). Note that since the data is already contained in the cache, the origin server will not respond with the data.

The system next receives the response code from the origin server (step 410). This response code indicates either "authorized" or "not authorized." These codes can be typical HTTP codes, such as "304" for authorized or "514" for not authorized. If the response is "authorized" (step 412), the system serves the data from the cache to the requester (step 414). Otherwise, the system sends an error message to the requester (step 426).

If the data is not in the cache at step 404, the system sends a normal request to the origin server for the data (step 416). The system then receives a response from the origin server (step 418). After receiving the response from the origin server, the system determines if the data is cacheable (step 420). If the data is cacheable, the system stores the data in the cache (step 422). If the data is not cacheable or after storing the data in the cache, the system serves the data to the requester ending the process (step 424).

Access Control

Figure 5:
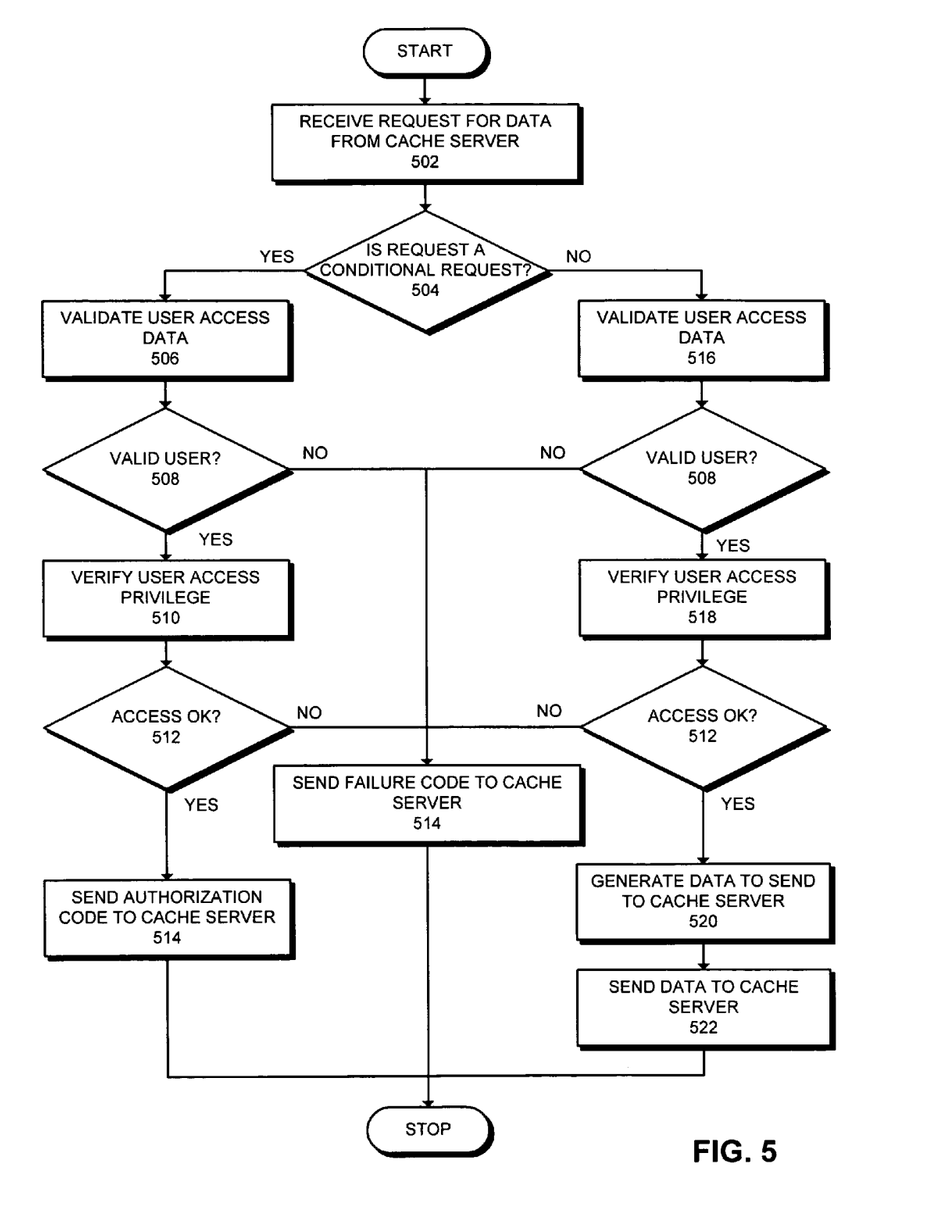
FIG. 5 presents a flowchart illustrating the process of determining whether an access request is authorized in accordance with an embodiment of the present invention.

FIG. 5 presents a flowchart illustrating the process of determining whether access is authorized in accordance with an embodiment of the present invention. The system starts when the origin server receives a request for data from the cache server (step 502). Next, the system determines if the request is a conditional request that requires authorization (step 504).

If the request is a conditional request, the system validates the user access data (step 506). If the user is not a valid user (step 508) the system sends a failure code to the cache server thereby ending the process (step 514). If the user is a valid user, the system next verifies the user's access privilege (step 510).

If the user is not authorized to access the data (step 512), the system sends a failure code to the cache server ending the process (step 514). On the other hand, if the user is authorized to receive the data, the system sends an authorization code to the cache server (step 514).

If the request is not a conditional request at step 504, the system validates the user's access data (step 516). If the user is not a valid user, the system sends a failure code to the cache server thereby ending the process (step 514). If the user is a valid user, the system next verifies the user's access privilege (step 518).

If the user is not authorized to access the data (step 512), the system sends a failure code to the cache server thereby ending the process (step 514). If the user is authorized to receive the data, the system generates the data to send to the cache server (step 520). Finally, the system sends the data to the cache server (step 522).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for serving data from a cache server wherein the data originates from an origin server, comprising:
   receiving a request for the data at the cache server;
   determining if the request requires access control;
   determining if a copy of the requested data of the origin server resides in the cache;
   if the request requires access control and the data resides in the cache,
   initiating, on behalf of a requester, an authorization from the origin server by:
      sending an authorization request to the origin server, wherein the authorization request includes access data for the requester,
      receiving a response to the authorization request from the origin server, and
      sending the data to the requester if the response is an authorization; and
   if the data at the origin server has been modified, invalidating the data at the cache server by:
      receiving an invalidation signal at the cache server from the origin server to invalidate the data, and
      invalidating the data at the cache server,
   wherein the data served by the origin server which does not include authentication data; and
   wherein the cache server retains a copy of a subset of the data generated or stored on the origin server.

2. The method of claim 1, wherein determining if the request requires access control involves determining if a uniform resource locator (URL) associated with the request is identified as requiring access control.

3. The method of claim 1, wherein the access data for the requester includes a user name and a password.

4. The method of claim 1, wherein the response indicates that the request is either authorized or not authorized.

5. The method of claim 1, wherein if the data is not available in the cache, the method further comprises:
   sending a content request to the origin server, wherein the content request includes access data for the requester; and
   if the origin server determines that the requester is authorized to receive the data,
      receiving the data from the origin server,
      if the data is cacheable, storing the data in the cache, and
      sending the data to the requester.

6. The method of claim 1, further comprising determining if the requester is authorized to access the data at the origin server.

7. The method of claim 6, wherein determining if the requester is authorized to access the data involves:
   validating the requester's identity;
   verifying the requester's access privilege; and if the requester is authorized to receive the data,
      returning a success code, otherwise
      returning a failure code.

8. A computer-readable storage medium storing instructions that when executed by a computer cause the computer to perform a method for serving data from a cache server wherein the data originates from an origin server, the method comprising:
   receiving a request for the data at the cache server;
   determining if the request requires access control;
   determining if a copy of the requested data of the origin server resides in the cache;
   if the request requires access control and the data resides in the cache, initiating, on behalf of a requester, an authorization from the origin server by:
      sending an authorization request to the origin server, wherein the authorization request includes access data for the requester,
      receiving a response to the authorization request from the origin server, and
      sending the data to the requester if the response is an authorization; and
   if the data at the origin server has been modified, invalidating the data at the cache server by:
      receiving an invalidation signal at the cache server from the origin server to invalidate the data, and
      invalidating the data at the cache server;
   wherein the data served by the origin server which does not include authentication data; and
   wherein the cache server retains a copy of a subset of the data generated or stored on the origin server.

9. The computer-readable storage medium of claim 8, wherein determining if the request requires access control involves determining if a uniform resource locator (URL) associated with the request is identified as requiring access control.

10. The computer-readable storage medium of claim 8, wherein the access data for the requester includes a user name and a password.

11. The computer-readable storage medium of claim 8, wherein the response indicates that the request is either authorized or not authorized.

12. The computer-readable storage medium of claim 8, wherein if the data is not available in the cache, the method further comprises:
   sending a content request to the origin server, wherein the content request includes access data for the requester; and
   if the origin server determines that the requester is authorized to receive the data,
      receiving the data from the origin server,
      if the data is cacheable, storing the data in the cache, and
      sending the data to the requester.

13. The computer-readable storage medium of claim 8, further comprising determining if the requester is authorized to access the data at the origin server.

14. The computer-readable storage medium of claim 13, wherein determining if the requester is authorized to access the data involves:
   validating the requester's identity;
   verifying the requester's access privilege; and
   if the requester is authorized to receive the data,
      returning a success code, otherwise
      returning a failure code.

15. An apparatus for sewing data from a cache server wherein the data originates from an origin server, comprising:
   a first receiving mechanism configured to receive a request for the data at the cache server;
   a determining mechanism configured to determine if the request requires access control;
   wherein the determining mechanism is farther configured to determine if a copy of the requested data of the origin server resides in the cache; and
   a first sending mechanism configured to send an authorization request to the origin server, wherein the authorization request includes access data for a requester,
   a second receiving mechanism configured to receive a response to the authorization request from the origin server,
   wherein the first sending mechanism and the second receiving mechanism initiate, on behalf of the requester, an authorization from the origin server, and a second sending mechanism configured to send the data to the requester;

a third receiving mechanism configured to receive an invalidation signal from the origin server, when the data at the origin server has been modified, to invalidate the data;

wherein the third receiving mechanism is further configured to invalidate the data at the cache server when the third receiving mechanism receives the invalidation signal;

wherein the data sewed by the origin server which does not include authentication data; and wherein the cache server retains a copy of a subset of the data generated or stored on the origin server.

16. The apparatus of claim 15, wherein determining if the request requires access control involves determining if a uniform resource locator (URL) associated with the request is identified as requiring access control.

17. The apparatus of claim 15, wherein the access data for the requester includes a user name and a password.

18. The apparatus of claim 15, wherein the response indicates that the request is either authorized or not authorized.

19. The apparatus of claim 15, wherein the first sending mechanism is farther configured to send a content request to the origin server, wherein the content request includes access data for the requester; and wherein the second receiving mechanism is further configured to receive the data from the origin server; and the apparatus further comprising a storing mechanism configured to store the data in the cache and wherein the second sending mechanism is farther configured to send the data to the requester.

20. The apparatus of claim 15, farther comprising an access determining mechanism configured to determine if the requester is authorized to access the data at the origin server.

21. The apparatus of claim 20, wherein determining if the requester is authorized to access the data involves:

validating the requester's identity;

verifying the requester's access privilege; and if the requester is authorized to receive the data, returning a success code, otherwise returning a failure code.

* * * * *

UNITED STATES PATENT AND TRADEMARK OFFICE
CERTIFICATE OF CORRECTION

PATENT NO. : 7,437,754 B2
APPLICATION NO. : 10/836917
DATED : October 14, 2008
INVENTOR(S) : Desai et al.

It is certified that error appears in the above-identified patent and that said Letters Patent is hereby corrected as shown below:

In column 4, line 14, delete "theserver," and insert -- the server, --, therefor.

In column 4, line 20, delete "106" and insert -- 106, cache server 102 --, therefor.

In column 5, line 9, delete "HTTP/1." and insert -- HTTP/1.1 --, therefor.

In column 7, line 23, in claim 1, delete "server," and insert -- server; --, therefor.

In column 8, line 50, in claim 15, delete "sewing" and insert -- serving --, therefor.

In column 8, line 56, in claim 15, delete "farther" and insert -- further --, therefor.

In column 9, line 13, in claim 15, delete "sewed" and insert -- served --, therefor.

In column 10, line 2, in claim 19, delete "farther" and insert -- further --, therefor.

In column 10, line 11, in claim 19, delete "farther" and insert -- further --, therefor.

In column 10, line 13, in claim 20, delete "farther" and insert -- further --, therefor.

Signed and Sealed this

Thirteenth Day of April, 2010

David J. Kappos
*Director of the United States Patent and Trademark Office*